United States Patent [19]
Daniel

[11] Patent Number: 5,546,800
[45] Date of Patent: Aug. 20, 1996

[54] EARLY WARNING TORNADO DETECTOR

[76] Inventor: Bernard Daniel, 515 S. Ave. P., Clifton, Tex. 76634

[21] Appl. No.: 554,760

[22] Filed: Nov. 8, 1995

[51] Int. Cl.$^6$ .................................................. G01W 1/00
[52] U.S. Cl. .................................. 73/170.16; 73/170.24; 340/602
[58] Field of Search .......................... 73/170.16, 170.24, 73/861.09; 340/949, 968, 601, 602; 324/72

[56] References Cited

U.S. PATENT DOCUMENTS

| | | | |
|---|---|---|---|
| 3,603,951 | 9/1971 | Bracken | 340/224 |
| 3,706,938 | 12/1972 | Petriw | 73/861.09 X |
| 3,753,117 | 8/1973 | Downing et al. | 324/72 X |
| 3,810,137 | 5/1974 | Bacon, Jr. et al. | 340/224 |
| 3,996,795 | 12/1976 | Servassier | 73/861.09 |
| 4,003,254 | 1/1977 | Bullis et al. | 73/861.09 |
| 4,017,767 | 4/1977 | Ball | 315/36 |
| 4,393,719 | 7/1983 | Wiegand et al. | 73/861.09 X |
| 4,812,825 | 3/1989 | Kennedy et al. | 73/170.24 X |
| 4,823,115 | 4/1989 | McCallie | 73/170.24 X |
| 5,218,300 | 6/1993 | Gouhier-Beraud | 324/72 |
| 5,237,281 | 8/1993 | Webster et al. | 73/861.09 X |
| 5,355,350 | 10/1994 | Bass et al. | 73/170.16 X |
| 5,379,025 | 1/1995 | Tatom et al. | 73/170.16 X |
| 5,428,358 | 6/1995 | Gardner | 73/170.16 X |

*Primary Examiner*—Richard Chilcot
*Assistant Examiner*—Elizabeth L. Dougherty
*Attorney, Agent, or Firm*—Michael I. Kroll

[57] ABSTRACT

An early warning tornado detector is provided. The detector utilizes a plurality of horizontally rotatable negative ion flow meters, each of said meters capable of taking measurements of negative ion flow in a linear direction. Means for recording said measurements are provided, as are means for determining the negative ion flow intensity for a fixed location by correlating the linear measurements corresponding to that location taken from at least two of said meters. Also provided is a method for early detection and tracking of meteorological conditions conducive to tornado formation in a given area. In this method the negative ion flow intensity threshold level which indicates that meteorological conditions are conducive to tornado formation in the area is first determined. Then, the negative ion flow intensity over the area is measured. By comparing the measured ion flow intensity with the threshold intensity, it can be determined if tornado formation is imminent.

10 Claims, 2 Drawing Sheets

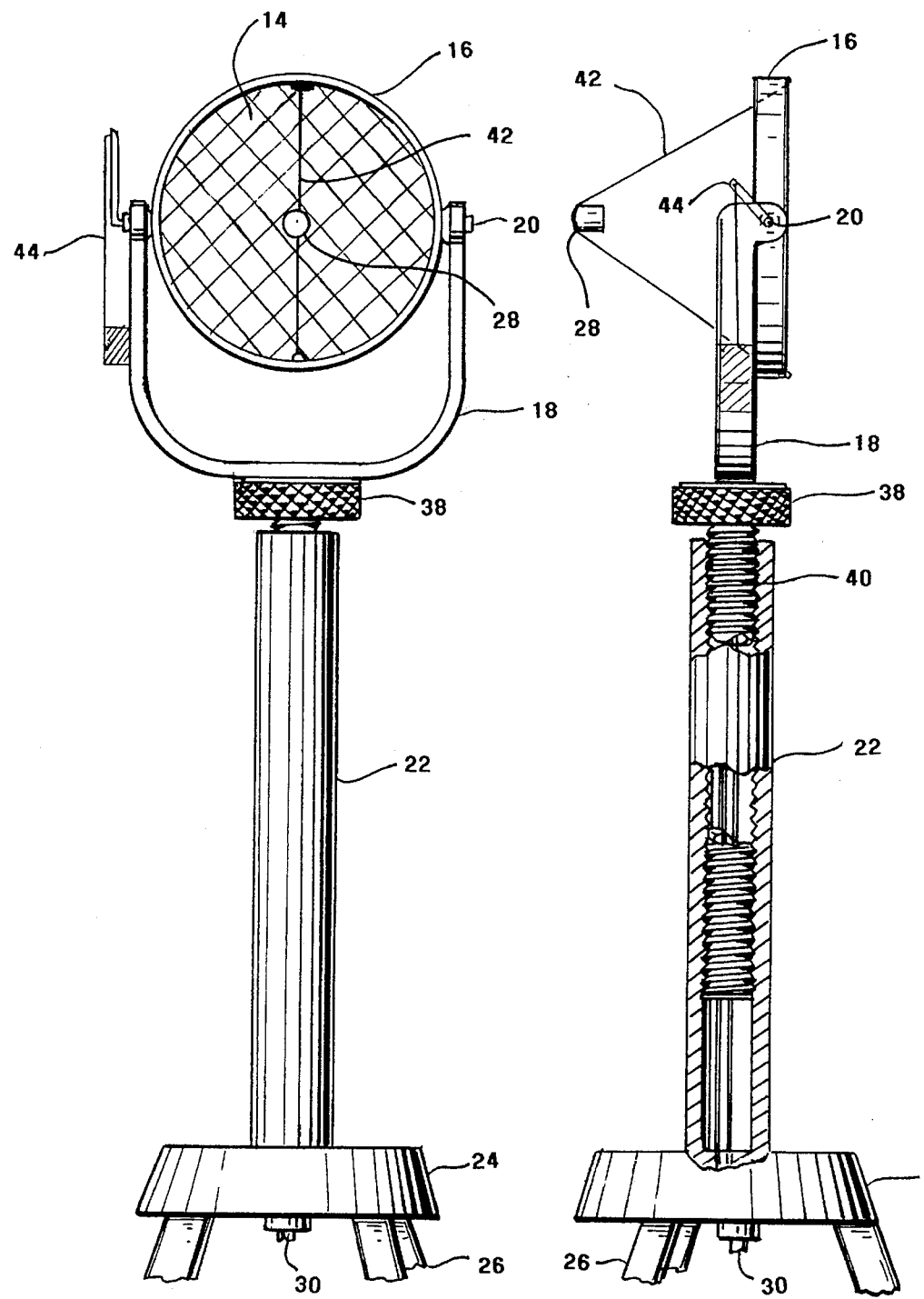

EARLY WARNING TORNADO DETECTOR

BACKGROUND OF THE INVENTION

Field of the Invention

The instant invention relates generally to weather forecasting devices and more specifically it relates to an early warning tornado detector.

Current tornado prediction relies on radar, the echoes of which enable the forecaster to identify areas with clouds, to identify the nature of the cloud elements, to estimate the precipitation rate, and to detect the formation of a tornado, at most, 20 to 30 minutes before a funnel touches down.

The instant invention takes advantage of the fact that the atmospheric conditions required for the formation of a tornado include great thermal instability, high humidity, and the convergence of warm, moist air at low levels with cooler, drier air above. These conditions are associated with the presence of a characteristically high level of atmospheric negative ions (electrons). By utilizing a plurality of negative ion detectors, the instant invention enables the detection of tornadic meteorological conditions hours before funnel touchdown, a significant advantage over prior technology.

SUMMARY OF THE INVENTION

A primary object of the present invention is to provide for the early detection of meteorological conditions conducive to tornado formation.

Another object is to provide an early warning tornado detector that utilizes a plurality of negative ion detectors to identify locations where the direction and intensity of negative ion flow indicate conditions conducive to tornado formation.

An additional object is to provide an early warning tornado detector capable of detecting tornadic conditions several hours before the formation of the actual tornado.

A further object is to provide an early warning tornado detector that is simple and easy to use.

A still further object is to provide an early warning tornado detector that is economical in cost to manufacture and use.

A still further object is to provide a method for early detection and tracking of meteorological conditions conducive to tornado formation in a given area, comprising determining the negative ion flow intensity threshold level which indicates that meteorological conditions are conducive to tornado formation in the area and measuring the negative ion flow intensity over the area to determine when such tornadic conditions exist.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a front perspective view of a negative ion flow meter used in connection with the instant invention.

FIG. 4 is a side view of the negative ion flow meter shown in FIG. 3, with the base portion shown in cross section.

DETAILED DESCRIPTION OF THE PREFERRED EMBODIMENTS

Figure 1:
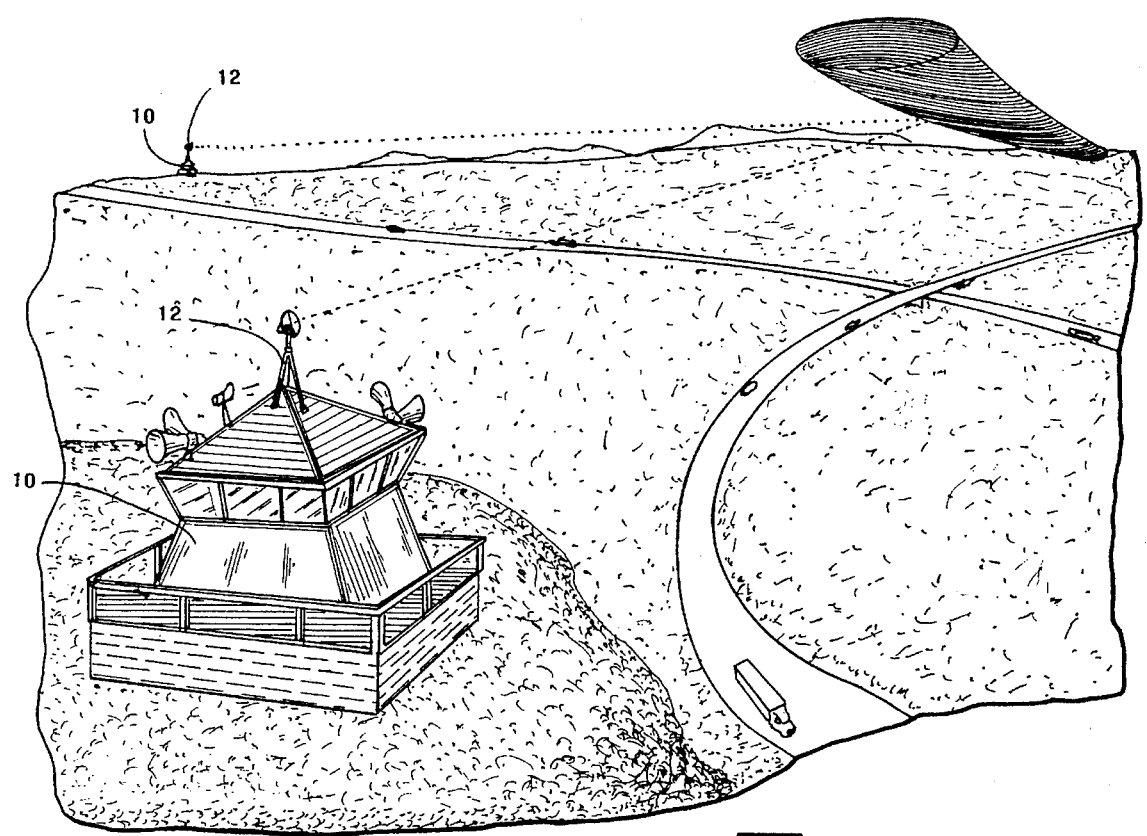
FIG. 1 is an exterior aerial view of two weather stations utilizing the instant invention to track a tornadic weather condition.

Turning now descriptively to the drawings, in which similar reference characters denote similar elements throughout the several views, FIGS. 1 through 4 illustrate an early warning tornado detector comprising a plurality of horizontally rotatable negative ion flow meters (also referred to herein as "negative ion detectors"), means for recording measurements made thereby, and means for determining the negative ion flow intensity for a fixed location by correlating the measurements corresponding to said location taken from at least two of said meters, for example, via standard triangulation techniques.

Figure 2:
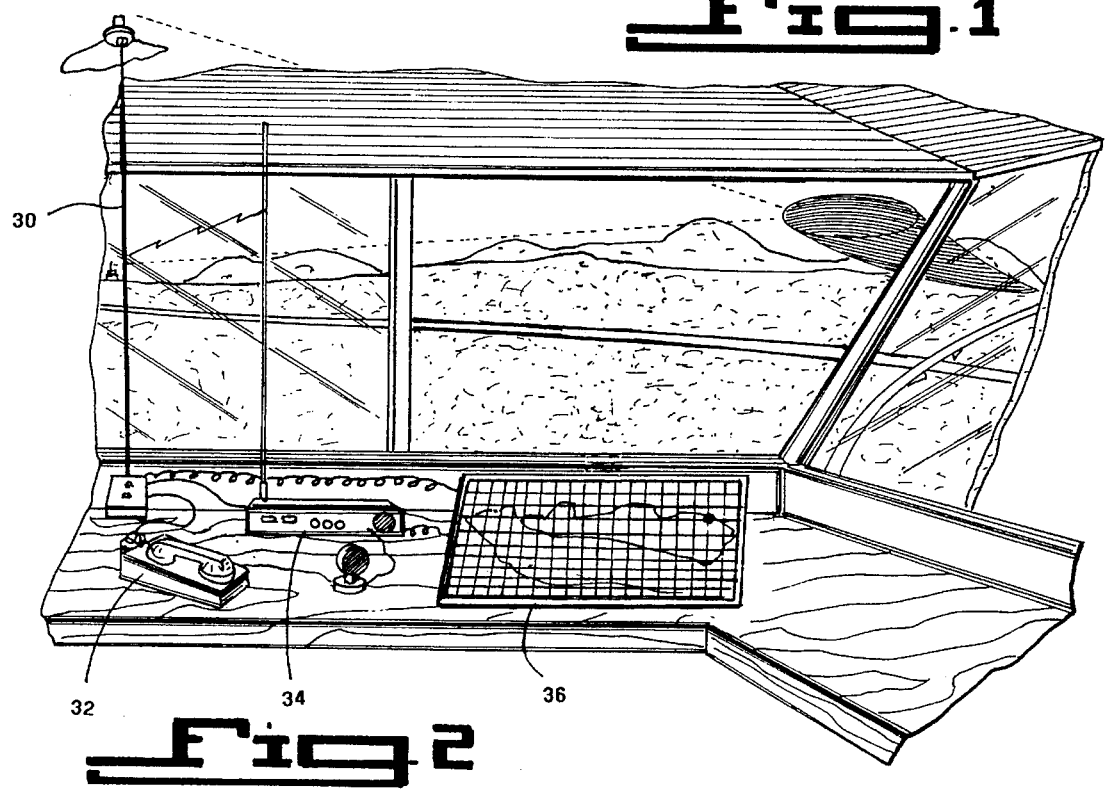
FIG. 2 is an interior view of the near station shown in FIG. 1 wherein the negative ion flow meter of the instant invention is shown connected to communication devices and a graphic map display.

FIGS. 1 and 2 illustrate weather stations 10 working cooperatively to track a tornadic weather system. Each station has a negative ion detector unit 12 mounted on its roof, a wire 30 through the roof to carry the signal from the individual detector units to the recording and/or communication devices, a telephone 32 and a radio 34. The triangulated signals can be displayed on a graphic map display 36.

FIGS. 3 and 4 illustrate the details of the negative ion detector units 12, each containing a negative ion detector grid 14 housed within a support ring 16, which in turn is mounted to a yoke 18 by a pivot 20. The yoke is mounted to a yoke support 38 secured to a support member 22, by means which allow the yoke to rotate horizontally, for example, by parallel circular threading 40 which mates the yoke support to the support member. The support member 22 is attached to the base 24, which is supported by a plurality of legs 26.

The support member can be hollow so as to act as a conduit for the wire 30 to carry the signal from the negative ion detector to the communication devices. The negative ion detector unit 12 can further contain a point source negative ion generator 28 attached to the detector grid support ring 16 by a plurality of support struts 42. The detector grid support ring can be made to pivot vertically relative to the yoke by the elevator 44.

LIST OF REFERENCE NUMBERS

10 weather station
12 negative ion detector unit
14 negative ion detector grid
16 detector grid support ring
18 yoke
20 pivot
22 support member
24 base
26 legs
28 point source negative ion generator
30 signal wire
32 telephone
34 radio 36 graphic map display
38 yoke support
40 parallel circular threading
42 negative ion generator support struts
44 elevator It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An early warning tornado detector comprising:
   a) a plurality of horizontally rotatable negative ion flow meters, said meters capable of taking measurements of negative ion flow in a linear direction;
   b) means for recording said measurements; and
   c) means for determining the negative ion flow intensity for a fixed location by correlating the linear measurements corresponding to said location taken from at least two of said meters.

2. An early warning tornado detector as recited in claim 1, wherein said negative ion flow meters are vertically rotatable.

3. An early warning tornado detector as recited in claim 2, wherein said negative ion flow meters further comprise a single point source negative ion generator.

4. An early warning tornado detector as recited in claim 1, wherein said negative ion flow meters comprise:
   a) a support member;
   b) a yoke support horizontally rotatably secured to said support member;
   c) a yoke mounted to said yoke support;
   d) a support ring mounted to said yoke; and
   e) a negative ion detector grid housed within said support ring.

5. An early warning tornado detector as recited in claim 4, wherein said support ring is mounted to said yoke by a vertically rotatable pivot.

6. An early warning tornado detector as recited in claim 5, wherein said negative ion flow meters further comprise a single point source negative ion generator attached to said support ring by a plurality of support struts.

7. An early warning tornado detector as recited in claim 6, further comprising elevator means for effecting vertical rotation of said support ring in said yoke.

8. An early warning tornado detector as recited in claim 7, further comprising a base to which said support member is attached and a plurality of legs supporting said base.

9. A method for early detection and tracking of meteorological conditions conducive to tornado formation in a given area, comprising the steps:
   a) determining the negative ion flow intensity threshold level which indicates that meteorological conditions are conducive to tornado formation in the area;
   b) measuring the negative ion flow intensity over the area; and
   c) comparing the measured ion flow intensity with the threshold intensity to determine if tornado formation is imminent.

10. A method as recited in claim 9, wherein the negative ion flow intensity over the area is measured by triangulating the measurements taken by a plurality of negative ion flow meters, each comprising:
   a) a support member;
   b) a yoke support horizontally rotatably secured to said support member;
   c) a yoke mounted to said yoke support;
   d) a support ring mounted to said yoke; and
   e) a negative ion detector grid housed within said support ring.

* * * * *